United States Patent [19]

Morris et al.

[11] Patent Number: 4,965,613
[45] Date of Patent: Oct. 23, 1990

[54] PAGE PRINTER WITH MACHINE-READABLE-CHARACTER-BASED CONTROLS

[75] Inventors: Scott S. Morris, Oklahoma City, Okla.; James F. Shramek, Burlington, Mass.; David P. Owsley, Edmond, Okla.

[73] Assignee: Bull HN Information Systems Inc., Billerica, Mass.

[21] Appl. No.: 449,641

[22] Filed: Dec. 12, 1989

[51] Int. Cl.$^5$ ............................................. G03G 21/00
[52] U.S. Cl. ..................................... 346/25; 355/208; 355/209; 355/214; 355/246
[58] Field of Search ............... 355/204, 208, 209, 214, 355/246; 346/25, 150, 153.1; 358/296, 300

[56] References Cited

U.S. PATENT DOCUMENTS

| | | | |
|---|---|---|---|
| 4,312,589 | 1/1982 | Brannan | 355/214 |
| 4,451,137 | 5/1984 | Farley | 355/214 |
| 4,575,224 | 3/1986 | Arnold | 355/214 |
| 4,693,592 | 9/1987 | Kurpan | 355/214 |
| 4,833,506 | 5/1989 | Kura | 355/208 |

Primary Examiner—Bruce A. Reynolds
Assistant Examiner—Scott A. Rogers
Attorney, Agent, or Firm—Gerald J. Cechony; John S. Solakian

[57] ABSTRACT

A data printer has the ability to print machine-readable information and, further instream, the ability to read and analyze such information. Results of that analysis are reporated back to a job control processor which, according to the analysis, monitors print quality, instructs the print engines to adjust print contrast, causes unacceptable pages to be invalidated, rejected and reprinted, and advises the operator regarding corrective actions to improve print quality or to reconcile print jobs.

15 Claims, 2 Drawing Sheets

PAGE PRINTER WITH MACHINE-READABLE-CHARACTER-BASED CONTROLS

FIELD OF THE INVENTION

This invention relates to page printers for use with data systems, and particularly to means for enabling such printers to dynamically monitor and regulate their own performance and to automatically reconcile jobs which include defective or unacceptable pages.

BACKGROUND OF THE INVENTION

Printing devices, for printing in legible form on paper a human-readable image specified to the printer by a stream of digital signals, are very well known in the prior art. The present invention is embodied in a printer such as the one described in U.S. Pat. No. 4,796,066, Jan. 3, 1989 (hereinafter, "the Morris patent").

Malfunctions and degradations may occur in such printing devices, resulting in unacceptably poor printed output. In the prior art, it is incumbent upon an operator to visually assess the quality of the output in order to verify correct function, and to direct the system to reprint jobs that were unacceptable. This requires close attention by the operator, and results in lost time and reduced system efficiency when it is necessary to reprint jobs. The longer it takes for the operator to detect incorrect operation, the more such jobs must be reprinted.

The present invention overcomes these drawbacks of the prior art by providing a printer with means for monitoring and maintaining the quality of its own output, informing the operator of trends in the operation that may alert him to the need to service the printer, automatically reprinting defective pages, and assisting the operator in "job reconciliation"—replacing particular defective pages in a job with reprinted pages to produce completed documents possessing integrity.

It is thus a general object of the present invention to provide improved data printers.

It is a particular object of the present invention to provide data printers with self-monitoring, self-correction, and automated job reconciliation.

SUMMARY OF THE INVENTION

The invention accomplishes this by providing the "print engines" (which, as is well known to those in the art, effect the actual formation of the images on the paper) with means for producing machine-readable images on the paper, and by providing means instream (i.e., further along the paper path) of the print engines for reading and verifying those machine-readable images. Verification may include character, quality, and contrast analysis, with results of the contrast analysis fed back to the print engines causing them to adjust print contrast accordingly. A job control system comprising computer devices is provided which interprets the results of the analysis and may determine that a page is unacceptable. An invalidator is provided which the job control system may direct to mark unacceptable pages for the operator's attention. If an output stacker with multiple bins (well known to those in the art) is provided, the job control system may direct unacceptable pages to be routed to a reject bin. The job control system may direct that unacceptable pages be reprinted. The job control system may assemble messages for the operator apprising him of printer status, recommended corrective actions, and information assisting him in performing job reconciliation.

Other advantages of the invention will be apparent to those skilled in the art after consulting the following detailed description and the appended drawings, wherein:

BRIEF DESCRIPTION THE DRAWINGS

DETAILED DESCRIPTION

Figure 1:
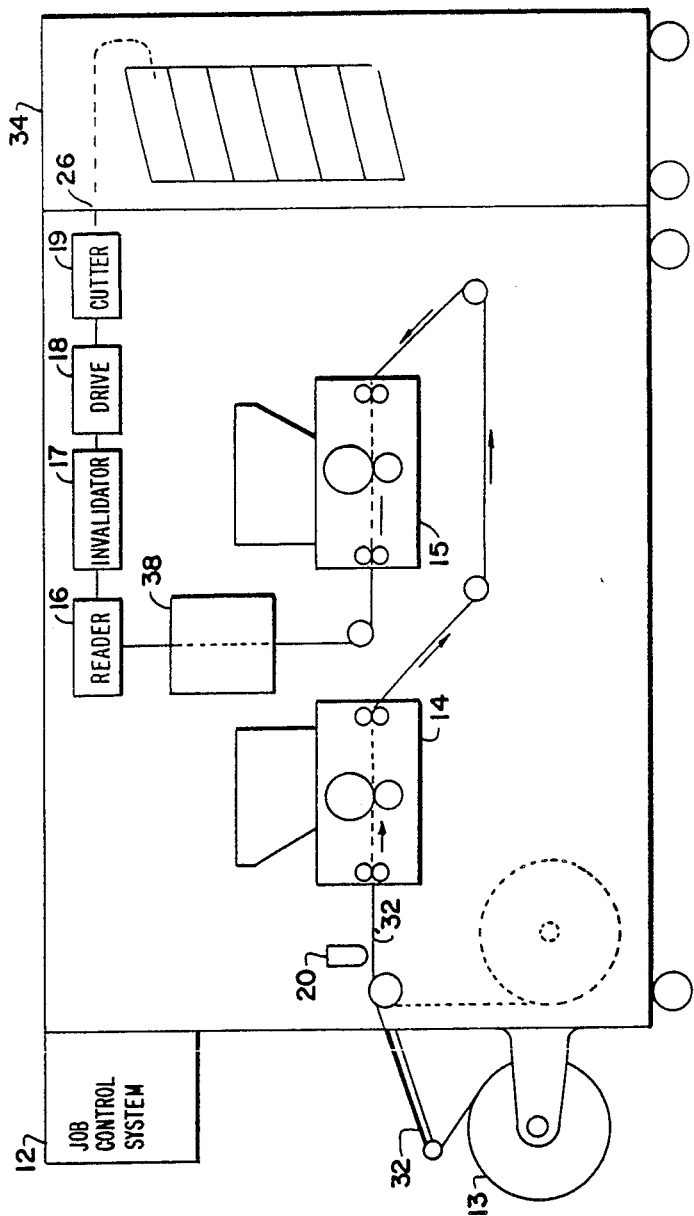
FIG. 1 is an overall mechanical block diagram of the printer of the present invention.

FIG. 1 is a mechanical block diagram of the printer of the present invention. While the invention is equally adaptable to the well-known genre of printers employing "sheet feeders" for feeding individual sheets of paper through the printer for printing, it is presently embodied in a printer which feeds from a roll 13 of continuous paper 32 and which cuts the paper into sheets 26 after printing. The paper on the roll 13 is fed into the printer and threaded through web sensor 20 (which by means well known to those in the art, detects breaks in the paper stream). The paper is then threaded through the "front" print engine 14, which prints information directed by a sequence of digital signals (not shown, but well known to those in the art) on one side of the paper (the "front"). As discussed in the Morris patent, a second print engine 15 (the "back" print engine) may be provided or easily retrofitted for printing on the other side (the "back") of the paper. The paper threads through print engine 15 (if present), then through toner fixing station 38 which adds an additional stage of toner fixing beyond that provided in the print engines, through reader 16, invalidator 17, drive 18 (which performs the act of pulling the paper from the print engine(s) and through the aforementioned elements outstream of drive 18) and propels it into cutter 19, which cuts the continuous paper into individual sheets 26 according to the page boundaries of the information that has been printed. From cutter 19 the sheets are ejected into stacker 34, which has at least one stacking bin and which may optionally have a plurality of bins and means for selectively routing sheets to the various bins.

Figure 2:
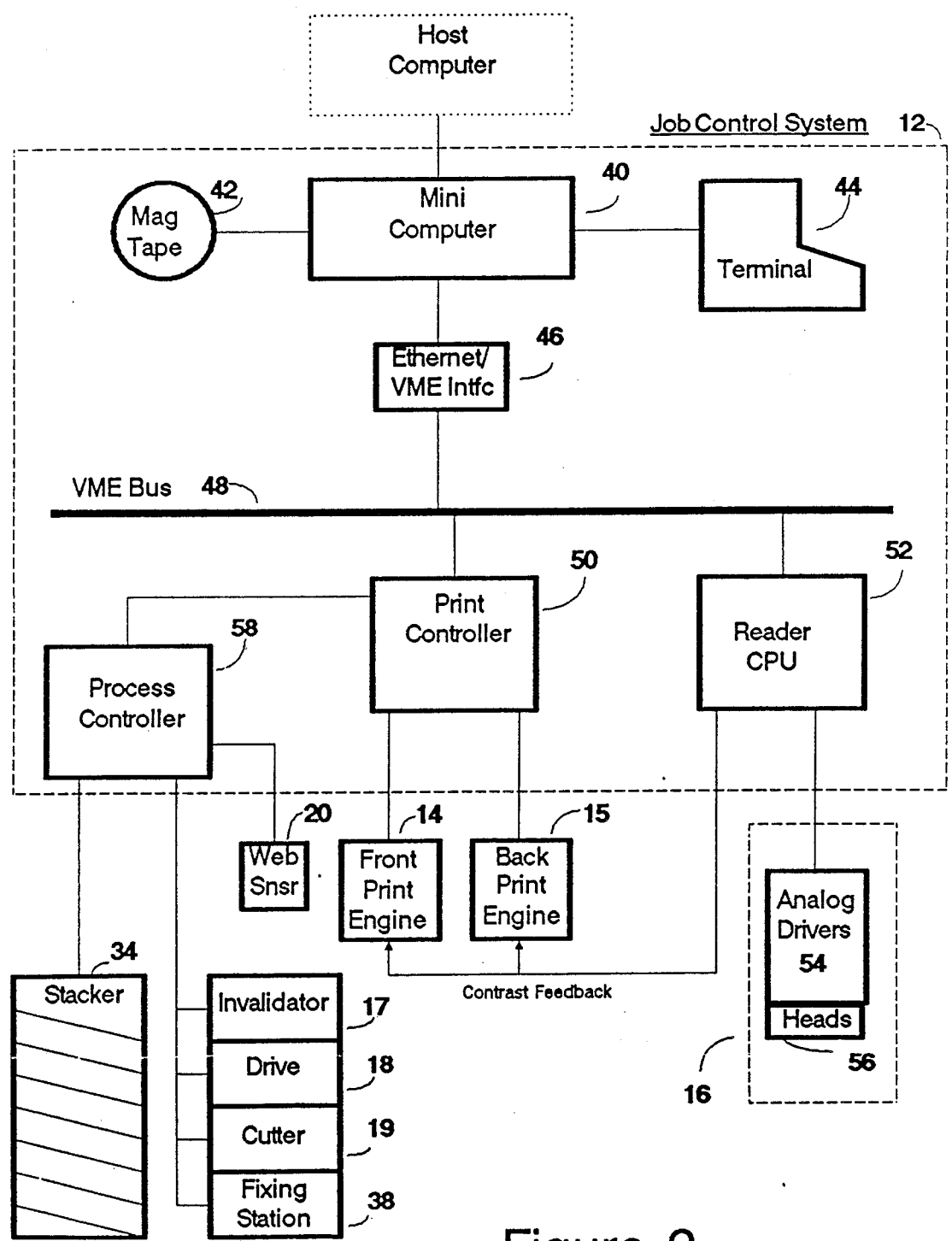
FIG. 2 is an overall functional block diagram of the printer of the present invention.

Referring to FIG. 2, Job Control System 12 comprises a minicomputer 40 with associated magnetic tape drive 42 and terminal 44, a VME bus 48, a print controller 50, a reader CPU 52, and a process controller 58. The VME bus is well known in the digital arts.

Minicomputer 40 is, in the present embodiment, a Bull Worldwide Information Systems model DPS-6. It is a free-standing minicomputer and is n©t housed within the printer cabinet. All other components discussed, except for magnetic tape unit 42 and terminal 44, are within the printer cabinet in the present embodiment.

Minicomputer 40 is connected to an external host computer where a user's job is presumed to be running. The user's job may, among other things, call for printing, sending data and formatting instructions down to minicomputer 40 as is well known to those in the art. Minicomputer 40 is provided with an interface to a terminal 44, and communicates with the operator by this a means. It is also provided with a removable-medium storage device, magnetic tape unit 42 in the present embodiment. Font and forms information and formats may be stored on the medium, and invoked for use in a user's job as a function of the instructions sent by the user's job, as is well known to those in the art. Sensitive or proprietary information, such as images of signatures for imprinting on checks, may be invoked from magnetic tape 42; the media containing such information may subsequently be removed and safely stored. The operator may be reminded via terminal 44 to adhere to these procedures.

Minicomputer 40 is connected to the printer cabinet via Ethernet(tm) in the present embodiment. Ethernet/VME communications module 46 interfaces the Ethernet path to the VME bus 48 internal to the printer.

Print controller 50 is connected to the VME bus. Its primary function is the direct control and monitoring of the print engines 14 and 15. It receives data and formatting instructions and generates the appropriate signals, by means well known to those in the art, to direct the print engines to print the desired images on the paper 32.

Print controller 50 informs process controller 58 of the job characteristics; process controller 58 accordingly controls the various mechanical elements of the printer to effect the requisite paper feeding, cutting the continuous paper 32 into sheets 26 at the appropriate places, routing sheets 26 to the appropriate bins of stacker 34, etc. As will be described further below, print controller 50 also monitors for incorrect or unacceptable operation; in the event of detecting such, it informs process controller 58 which effects appropriate actions, such as invalidating and rejecting defective sheets.

The print engines 14 and 15 are provided with the ability to print machine-readable characters on the paper; in the present embodiment, these are MICR (Magnetic Imprint Character Recognition) characters, in either the E13B or the CMC7 fonts, well known to those in the art; alternatively, they could be OCR (Optical Character Recognition) characters. The machine-readable characters to be printed may be specified in the incoming data stream from the host computer, or locally by Job Control System 12. Machine-readable characters may be imprinted on every page for constant verification, or periodically on selected pages for spot checking. Under control of Job Control System 12, such printing may be on "extra" pages (i.e., pages not called for by the incoming data stream) so as not to introduce extraneous printing into a user's job; such extra pages may later be sent by the stacker to a bin other than the one in which the user's job is being stacked.

Reader 16, (a MICR reader in the present embodiment) positioned instream from the print engines, is adapted from well-known apparatus used in reader/sorter technology. (Paper movement is significantly faster in reader/sorter technology than in a printer; one skilled in the art can adapt the reader to function with a slower-moving medium.) In the present embodiment, paper speed is in the range of 16.5 ips to 27 ips.

Reader 16 can read the MICR characters regardless of whether they were preprinted on the paper, printed as a function of the externally-supplied data stream, or printed as a function of a command from Job Control System 12. Reader 16 is seen on FIG. 2 to comprise the heads 56 and the analog drivers 54, which are connected to Reader CPU 52.

Heads 56 comprise a write head and a read head, oriented such that the read head is further instream;

therefore, paper passes under the write head first. Spacing between the heads is a fraction of an inch in the present embodiment. The write head magnetizes the toner comprising the MICR character imprint; a short time later the MICR characters pass under the read head which senses the magnetic field of the magnetized toner. Analyses can then be performed on the output of the read head. An unacceptably low magnetic field might indicate that the print engines are applying insufficient toner to the paper, or that the toner is defectively low in magnetic material.

The drivers 54 in conjunction with Reader CPU 52 perform, by means known to those in the art, the following analyses of the machine-readable characters:

Signal strength level (strength of the magnetic properties of the print);

Character footprint (conformance to the defined shape);

Line stroke width dimensions as compared to the specification (e.g., 13 mils for the E13B font);

Format of each character as well the character-to-character spacing;

Format of the data stream for field lengths and types of data.

Data misreads when comparing the original data to be printed with what was actually printed and read;

Statistical analysis on printer variables that may be approaching states where they may affect the quality of the output and should be acted upon.

As a result of the contrast analysis on the machine-readable characters and, if they were printed by the print engines (as opposed to having been preprinted on the paper), Reader CPU 52 can generate and feed back signals to the contrast control inputs provided on the print engines directing them to adjust their contrast. (In the prior art, the contrast control input to the print engines is developed entirely from a manual front-panel control; with the present invention, the feedback signal from the Reader CPU interacts with the state of the manual control.)

Should the Job Control System 12 determine, as a function of the signal strength analysis provided to it by Reader 16, that the page is unacceptable, it can direct invalidator 17 to physically mark the page so that the operator may subsequently identify it and remove it from the job. This marking may take any of several forms to be chosen by the designer. The invalidator can be a punch that will punch holes through the page; it may be an automated "stamp pad" which will stamp a predetermined pattern on the page; it may be a print engine (for reasons of economy, probably a rudimentary one) that will print a message on the page. If a stamp pad, the invalidation imprint will be fixed from page to page within a job, although it can be changed by physically changing the stamping device. If a print engine, Job Control System 12 can control it to print a different message on each page invalidated.

If stacker 34 is optionally of the type with multiple selectable bins, Job Control System 12 can control it to route rejected pages to a reject bin. Alternatively, the cutter might be directed to cut the page into smaller-than-normal pieces.

Job Control System 12 can also direct print engines 14 and 15 to reprint pages that have been invalidated. If only the last page printed must be reprinted, the necessary information is still contained within print controller 50 (which is performing "page-level buffering". If more pages must be reprinted, print controller 50 requests that the requisite information be resent from minicomputer 40, which is performing "job-level buffering".

The kind of stacker employed (single bin or selectable multibin) bears on the manner in which job reconciliation may be effected.

If a multibin stacker is used, a method of job reconciliation that most simplifies the operator's task can be employed: an unacceptable page and all pages following it that have already been printed can be routed to the reject bin and printing can be restarted from the unacceptable page, with all acceptable pages being stacked in a "normal" bin. The end result of this will be a complete acceptable document in the normal bin with no intervention required from the operator except that he remove it from the normal bin. This approach does have the disadvantage of wasting some paper and printing time, since it may result in the rejecting and reprinting of pages that, viewed by themselves, would have been acceptable.

Another method that may be employed, regardless of which kind of stacker is used, is to reprint only the unacceptable pages. This results in reprinted pages being stacked out of order within the document; if a single bin stacker is employed, it also results in unacceptable pages being stacked with the document. Operator intervention is thus required to insert reprinted pages into their proper positions, and to remove rejected pages. (This is simplified by virtue of the rejected pages' having been marked in some way by invalidator 17.) Job Control System 12 is employed to compile and provide to the operator a summary instructing him as to what pages must be removed and which must be reordered. This summary may be printed for him by the print engines, or displayed to him on terminal 44.

Ancillary to the reconciliation function, Job Control System 12 can keep track of how much paper should have been used, for later comparison with the amount actually used. This provides useful controls on the consumption of paper stock that is deemed to be proprietary or sensitive, such as check blanks, and thus enhances overall site security.

The reconciliation function can also oversee the reconciliation of jobs in which web sensor 20 has detected a failure in the paper stream.

Those skilled in the art will appreciate other advantages that may be gained from the use of the invention, in the present embodiment or in other embodiments. The invention is intended to be embraced by the appended claims and not limited to the particular embodiment described above.

That which we regard as novel and desire to protect by Letters Patent of the United States is:

1. In combination in a data printer having paper feeding means for feeding paper along a paper path from an outstream paper supply to an instream paper stacker and at least one print engine located on the paper path and responsive to externally-supplied digital signals for imprinting on the paper alphanumeric information specified by the digital signals:

a job control processor comprising digital computer means for a controlling elements of the printer;

means in the print engines responsive to the digital signals or the job control processor for imprinting machine-readable characters on the paper; and means instream from the print engines for reading machine-readable characters and for sending digital representations of the characters to the job control processor.

2. The combination recited in claim 1, wherein further:

the machine-readable character reading means performs signal strength and quality analysis of the machine-readable characters and generates contrast signals from that analysis.

3. The combination recited in claim 2, wherein further the contrast signals are forwarded to the print engines and the print engines adjust contrast of imprinted characters responsive to the contrast signals, whereby print contrast is dynamically controlled.

4. The combination recited in claim 2, wherein further the job control processor determines from the strength and quality analysis whether each page is of acceptable quality.

5. The combination recited in claim 4, further comprising means instream from the machine-readable character reading means and responsive to the job control processor for selectively marking pages of unacceptable quality as invalid.

6. The combination recited in claim 5, further characterized in that the job control processor signals the print engines to reprint the invalidated pages.

7. The combination recited in claim 6, further characterized in that, responsive to the job control processor, all pages in the print engines or instream from the print engines but outstream from the invalidation means at the time of invalidation of a page are invalidated and reprinted regardless of the quality analysis.

8. The combination recited in claim 7, further characterized in that the stacker has a plurality of bins and means for selectively routing pages to any of the bins, and in that all valid pages are selectively routed, responsive to the job control processor, to first certain bins and all invalidated pages are selectively routed to second certain bins.

9. The combination recited in claim 6, further characterized in that the job control processor furnishes a report directing an operator regarding the positions of invalidated pages in the stacker, the positions of reprinted replacements for such invalidated pages, and instructions for replacing the former with the latter.

10. The combination recited in claim 2, further characterized in that:

results of signal strength and quality analysis are periodically forwarded to the job control processor;

the job control processor tabulates the signal strength and quality analysis results and maintains queues of data for informing an operator of printer status and recommending a corrective actions to an operator; and the job control processor provides reports of printer status and recommended corrective actions to the operator upon his request.

11. The combination recited in claims 5, 6, or 7 wherein further:

the job control processor accounts for all paper used and reports those accounts to an operator upon his request.

12. The combination recited in claim 1 wherein further:

the job control processor further comprises a removable-media data storage device; and the job control processor retrieves certain information from the data storage device and forwards it to the print engines for imprinting on the paper along with information specified by the digital signals.

13. The combination recited in claim 12 wherein further:
the job control processor, responsive to certain of the externally-supplied digital signals, directs an operator to load media onto or remove media from the data storage device.

14. The combination recited in claim 1, wherein further:
the job control processor compares the characters read by the machine-readable-character reading means with those specified by the externally-supplied digital signals;
a means outstream of the reading means, responsive to the job control processor, marks certain pages as invalid; and
for any pages on which characters read by the reading means do not correspond to those specified by the digital signals, the job control processor signals the invalidation means to mark such pages as invalid.

15. The combination recited in claim 14, wherein further:
the job control processor directs the print engines to reprint pages marked as invalid.

* * * * *